United States Patent

[11] 3,569,819

| [72] | Inventors | Francois D. Martzloff;<br>William McMurray; John P. Walden,<br>Schenectady, N.Y. |
|---|---|---|
| [21] | Appl. No. | 791,750 |
| [22] | Filed | Jan. 16, 1969 |
| [45] | Patented | Mar. 9, 1971 |
| [73] | Assignee | General Electric Company |

[54] RECOVERY SYSTEM FOR SHORT CIRCUITS THROUGH SWITCHING DEVICES IN POWER CIRCUITS
8 Claims, 4 Drawing Figs.

| [52] | U.S. Cl. | 321/12, 321/4, 321/14, 321/45 |
| [51] | Int. Cl. | H02m 1/18, H02h 7/14 |
| [50] | Field of Search | 321/4, 11—14, 45, 45C; 307/202; 317/53 (Inquired) |

[56] References Cited
UNITED STATES PATENTS
3,406,327  10/1968  Mapham et al. .............. 321/45

OTHER REFERENCES
The Institution of Electrical Engineers, Paper No. 3889E, " An Audio-Frequency High Power Generator Employing Silicon Controlled Rectifiers," pp. 255, 256, May 1962, Copy in Class 321/45

*Primary Examiner*—William H. Beha, Jr.
*Attorneys*—Frank L. Neuhauser, Oscar B. Waddell, James C. Davis, Jr., Edward W. Goebel, Jr. and Joseph B. Forman ABSTRACT: When a short circuit or shoot-through occurs in a power circuit having two thyristors in series with commutating circuit inductors, a shunt capacitor isolated from the DC power supply by an impedance automatically resonates with the inductors to turn off both thyristors. A second automatic recovery system for repeated short circuits that occur before the capacitor has recharged operates to temporarily disable the power supply. In a high-voltage inverter the impedance is a resistor functioning to dampen voltage overshoots and to implement a relay or solid state second recovery system.

Inventors:
Francois D. Martzloff,
William McMurray,
John P. Walden, by Donald R. Campbell
Their Attorney.

RECOVERY SYSTEM FOR SHORT CIRCUITS THROUGH SWITCHING DEVICES IN POWER CIRCUITS

This invention relates to a recovery system for short circuits through at least two solid-state switching devices effectively connected in series circuit relationship between the power supply terminals of a power circuit. A short circuit of this type is commonly referred to as a shoot-through. More particularly, the invention relates to an improved inverter or other power circuit, especially a high-voltage power supply, employing thyristors as the current switching devices, wherein the improvement comprises the addition of an automatically operable first recovery system in the event of a short circuit condition caused by the simultaneous turn-on of both thyristor devices, and a second automatically operable recovery system that is effective to temporarily disable or shut down the power supply should another short circuit occur before the first recovery system again becomes operable.

Power circuits such as inverters and some time ratio control circuits commonly include one or more series circuits each connected across the direct current power supply terminals and comprising a pair of solid-state thyristor switching devices connected in series with at least one inductive element, or with all or a portion of the commutating inductance of the commutating circuits for reducing the current through a conducting thyristor below the holding value to render it nonconductive. The two series-connected thyristor devices are normally alternately conductive, however, the power circuit occasionally experiences a malfunction that causes both thyristors to be turned on at the same time. When this occurs, the inductive components are ineffective to prevent the rise of current, and the two conducting thyristors effectively short circuit the power supply terminals. Unless the short circuit or shoot-through is corrected promptly, the rising level of current will destroy the devices. The usual cases causes of a shoot-through include erratic behavior of the gating circuits for the thyristors, which results in generating spurious or irregularly timed gating signals whereby both thyristors are gated on simultaneously, or abnormal circuit conditions which for instance create a high rate of rise of voltage that is above the rating of the nonconducting thyristor so that it is erroneously turned on in this manner. The problem of a shoot-through is especially gating in a high-voltage inverter power supply. High-voltage power supplies such as those associated with capacitive load electrostatic processes, can be subjected to arcing, and this arcing is particularly effective in creating electromagnetic interference that disrupts the normal timing of the gating circuits. Even though the gating circuits are carefully designed and suitably shielded, and suppression circuits are connected across the thyristors to limit the rate of rise of voltage, these shielding and suppression techniques while raising the level of interference necessary to produce a short circuiting of the switching devices are not likely to entirely eliminate the interference. Therefore, it is desirable to include in the power circuit, and especially high-voltage power supply circuits, some means of recovering from the shoot-through condition by turning off the devices before the energy dissipated in the devices is injurious.

Accordingly, an object of the invention is to provide an improved short circuit recovery system for power circuits constructed in any circuit configuration that includes a pair of solid-state switching devices connected in series with inductive elements between the power supply terminals and that are provided with independent commutating circuits.

Another object is to provide an improved solid-state power circuit incorporating an automatic recovery system for protection against the injurious continuation of short circuits resulting from a malfunction that causes both thyristor devices to be turned on simultaneously.

Yet another object of the invention is the provision of an automatic short circuit recovery system for a power circuit of the foregoing type which includes a first recovery system that is operative when a short circuit condition first appears, and a second recovery system operable to correct recurring short circuits that occur before the first recovery system is again operative.

A further object is to provide an improved high-voltage inverter power supply designed to dampen voltage overshoots and to include an automatic shoot-through recovery system.

In accordance with the invention, an automatic short circuit recovery system is added to a power circuit of the type comprising at least one series circuit including at least two solid-state thyristors connected in series circuit relationship with inductor means between a pair of power supply terminals that in turn are connected across an electric potential power supply, and having associated commutating circuits including the inductor means for turning off the thyristor devices after desired periods of conduction. First automatic recovery means is operative when both thyristor devices erroneously turn on simultaneously and comprises a series impedance and a shunt capacitor connected between the power supply and series circuit, wherein the capacitor and aforementioned inductor means of the series circuit form a series resonant circuit that is tuned to a frequency selected to supply reverse current for a period of time sufficient to render the short-circuited thyristors nonconductive. This frequency is usually substantially lower than the frequency of the commutating circuits. Second automatic recovery means is provided to turn off the thyristors following a repeated short circuit that occurs before the capacitor of the first recovery system has recharged. In a high-voltage inverter, the series impedance of the first recovery system is conveniently a resistor to dampen voltage overshoots, and the voltage across the resistor is used in conjunction with means for sensing zero voltage between the power supply terminals to implement the second recovery system using electromechanical relays or all solid-state circuitry.

The foregoing and other objects, features, and advantages of the invention will be apparent from the following more particular description of several preferred embodiments of the invention, as illustrated in the accompanying drawings wherein.

Figure 1:
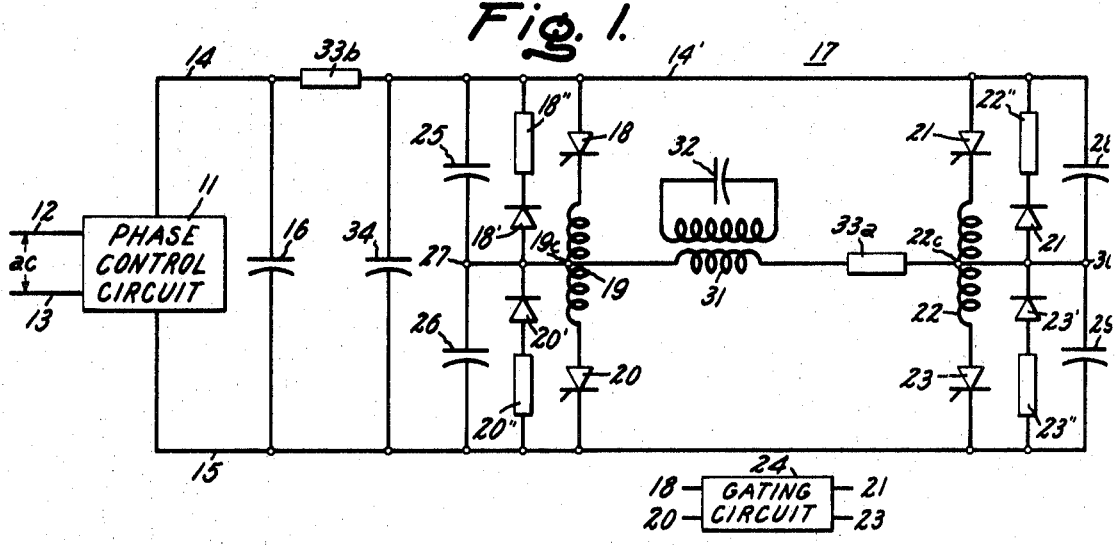
FIG. 1 is a schematic circuit diagram of a high-voltage inverter power supply incorporating a first automatic short circuit recovery system that is effective against an initial short circuit.

The DC power supply for the high-voltage inverter shown in FIG. 1 comprises a full-wave rectifier phase control circuit 11 having a pair of input terminals 12 and 13 that are adapted to be connected across a source of alternating current electric potential. The phase control circuit 11 supplies an adjustable DC voltage between its output terminals 14 and 15, and the unidirectional output voltage is filtered or smoothed by a suitable filter circuit including at the minimum a filter capacitor 16 connected directly between the positive DC supply terminal 14 and the negative DC supply terminal 15, but also usually including some inductance or resistance. These components constitute the DC power supply for the inverter circuit indicated generally at 17. A resistor 33b whose function will be described later is in series with the terminal 14 and establishes an inverter power supply terminal 14'.

Although the inverter circuit 17 may have various circuit configurations, the full bridge circuit configuration is illustrated. The inverter comprises a first series circuit connected between the DC supply terminals 14' and 15 comprising a silicon-controlled rectifier 18 or other suitable thyristor connected in series circuit relationship with a commutating inductor 19 and a second silicon-controlled rectifier 20, and a second series circuit likewise connected between the DC supply terminals and including a third silicon-controlled rectifier 21 connected in series circuit relationship with another commutating inductor 22 and a fourth silicon-controlled rectifier 23. The silicon-controlled rectifier is a unidirectional conducting gate-controlled thyristor and is more particularly a solid-state device wherein conduction through the device can be initiated, when the anode is positive relative to the cathode, by the application of a gating signal to its gating control electrode, but thereafter the gating signal loses control over conduction through the device and in order to render it nonconductive or commutate it off, it is necessary to reduce the current through the device below the holding current or reverse bias the device by making the anode potential negative relative to the cathode potential. The gating signals for rendering the thyristors conductive in the appropriate order to be described are generated in a gating circuit 24 which is not illustrated in detail because such controls are conventional. Suitable gating circuits which may be used are described for instance in the Silicon Control Rectifier Manual, 4th Edition, published by the Semiconductor Products Department, General Electric Company, Syracuse, N.Y., copyright 1967. In order to commutate off the thyristors 18 and 20, a pair of commutating capacitors 25 and 26 are connected in series circuit relationship between the DC supply terminals 14' and 15, and their junction point 27 is connected to the center tap 19c of the commutating inductor 19. On the other side of the bridge, the commutating circuits for the thyristors 21 and 23 in like manner include a pair of series connected commutating capacitors 28 and 29 having their junction point 30 connected to the center tap 22c of the commutating inductor 22. These commutating circuits operate in known manner to reduce the current through a conducting thyristor below the holding value in order to turn it off. For instance, with the thyristor 18 conducting current to the load connected to the center tap 19c of the commutating inductor 19, and the thyristor 20 in a turned-off condition, the commutating capacitor 26 charges such that the junction point 27 is approximately at the potential of the positive DC supply terminal 14'. In order to commutate off the thyristor 18, the series connected thyristor 20 is gated on, thereby connecting the half of the commutating inductor 19 between the center tap 19c and the anode of thyristor 20 across the positively charged capacitor 26. By autotransformer action, the end of the commutating inductor 19 adjacent the cathode of thyristor 18 is driven to a potential greater than that of the positive DC supply terminal 14', and current flows through thyristor 18 in the reverse direction, until thyristor 18 blocks or ceases conduction. The series connected diode 20' and resistor 20'' provide a coasting path for reactive current, and the other three quadrants of the bridge have similar feedback and coasting circuits including appropriately reversely poled diodes, the elements of these circuits being indicated by corresponding primed and double primed numerals as are used to designate the respective thyristors.

The load circuit is connected between the commutating inductor center taps 19c and 22c and includes the primary winding of a voltage stepup transformer 31 connected in series circuit relationship with a voltage overshoot damping resistor 33a. Across the secondary winding of the stepup transformer 31 is connected a capacitive load 32 of the type for instance used in various electrostatic processes. Electrostatic processes that require a high-voltage inverter power supply include, for example, the coating of abrasive particles on base materials in the manufacture of sandpaper, or electrostatic cleaning for removing pollution from the air. The switching devices of the inverter circuit 17 are controlled to produce approximately a square wave output and the net effect of the load circuit is inductive in character. In the normal mode of operation, thyristors 18 and 23 are turned on simultaneously for a desired period of conduction, and when it is desired to turn off thyristor 18 the series connected thyristor 20 is turned on to initiate the commutation of thyristor 18 in the manner previously explained. The reactive current then flows through the coasting path including the thyristor 23 and the series connected resistor 20'' and diode 20'. To initiate the second half of the cycle, the thyristor 21 is gated on, thereby initiating the commutation of the previously conducting thyristor 23, and completing the circuit through the thyristor 20 so that the current in the load circuit flows in the opposite direction.

Let it be assumed for the moment that the series resistor 33a is not included in the load circuit. A characteristic of a high-voltage supply driving a capacitive load is that the stepup transformer 31 inherently will have substantial leakage inductance. Together with the capacitance of the load 32, this produces an oscillatory or ringing circuit that produces an overshoot of the output voltage square wave as shown by the waveform in FIG. 2a. High-voltage power supplies are in general subject to arcing, and a capacitive load such as those used in electrostatic processes which produces an overshoot of the load voltage is even more likely to produce arcing. Such power supplies are furthermore especially prone to short circuits or shoot-throughs caused by erroneously turning on simultaneously two thyristor devices connected in series between the power supply terminals. This does not include the deliberately produced controlled short circuit which occurs when the thyristors are operated in the normal commutation mode as previously described, since these currents are controlled and do not produce the abnormally high levels of current which if continued will eventually destroy the devices. A leading cause of short circuits when there is a high-voltage overshoot is that the breakdown in the load is a source of electromagnetic interference that produces abnormal behavior of the control circuit by generating spurious gating signals or erratically timed gating signals.

Figure 2:
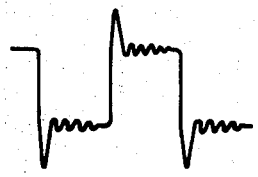
FIGS. 2a and 2b are load voltage waveform diagrams respectively for a circuit similar to FIG. 1 except that the series resistance is not added, and for the FIG. 1 circuit where series resistance is added.

By including in the load circuit the series resistance 33a as shown in FIG. 1, the circuit is damped and the overshoot of the voltage across the load is reduced. With the series resistance included, a load voltage output waveform of the type given in FIG. 2b is produced. It is possible to obtain the same effective load voltage without the overshoot which increases the probability of arcing. A combined solution to the problem of voltage overshoot and the problem of recovery from a short circuit is obtained by dividing the series resistance into two parts and placing the other resistor 33b in series with the positive DC supply terminal 14 between the DC supply and the inverter circuit 17 in order to obtain a degree of isolation between these components. Also, a short circuit recovery system capacitor 34 is connected across the DC supply terminals 14' and 15 between the resistor 33b and the inverter circuit 17. When a short circuit occurs due to, for instance, the simultaneous turn-on of the two series connected thyristors 18 and 20, the capacitor 34 and commutating inductor 19 form a series resonant circuit having a desired frequency to produce on the second half cycle of oscillation reverse current of sufficient duration to commutate off the devices 18 and 20. This short circuit recovery system operates automatically and is effective to turn off the series connected thyristors before the high level of current exists for a sufficient length of time to be injurious. The frequency of this short circuit recovery system series resonant circuit should be substantially lower than the frequency of the inverter commutation circuit, since it has been found that the duration of current reversal must be well in excess of the published turnoff times of the thyristors to effect commutation after a shoot-through. The short circuit current levels are of course much higher than the normal load current levels.

Figure 3:
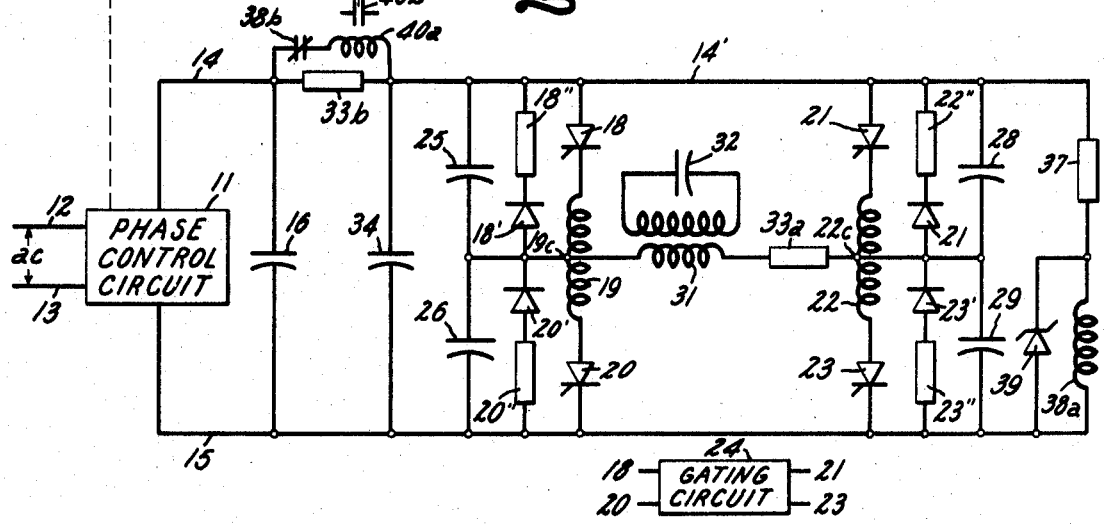
FIG. 3 is a modification of FIG. 1 that additionally includes a second recovery system employing relays to protect against repetitive short circuits and FIG. 4 is similar to FIG. 3 but features a solid-state short circuit recovery system.
Figure 4:
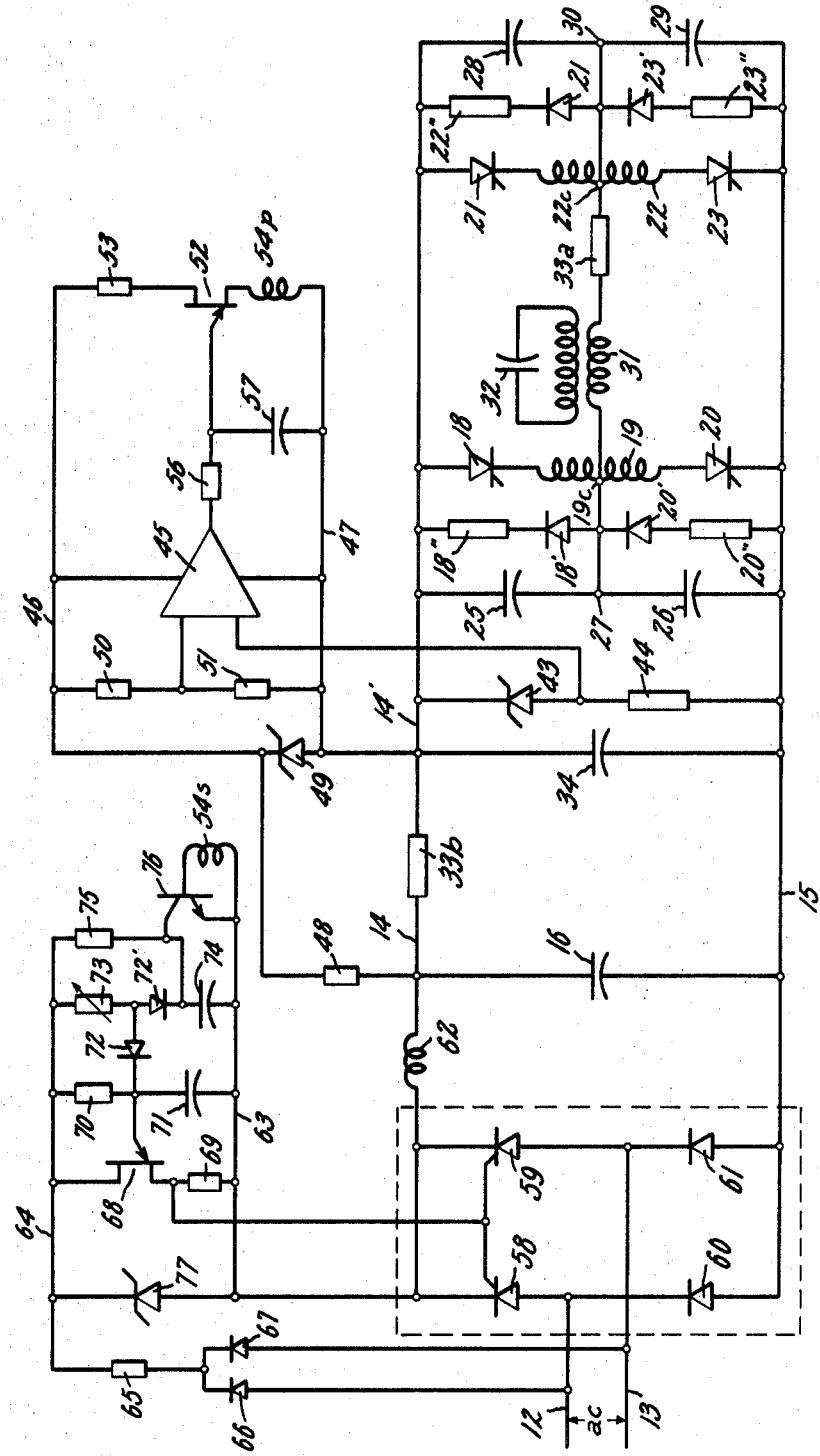

In FIG. 1, a repetitive short circuit may occur before the capacitor 34 has recovered and recharged to its original polarity. FIG. 3 additionally includes a second short circuit recovery system implemented in relays which is operative under these conditions to temporarily retard or disable the DC supply for a period long enough to reduce the current through the short-circuited thyristors to below the holding value so that they turn off. This so-called second line of defense is implemented by the use of two electromechanical relays, one of which senses the collapse of voltage between inverter input supply terminals 14' and 15, while the other is responsive to the fact that all of the DC supply voltage then appears across the resistor 33b. Voltage dropping resistor 37 is connected in series with the coil 38a of the first relay across the supply terminals 14' and 15, and a Zener diode 39 is connected to the junction of these two elements to limit the voltage appearing across the coil 38a over the range of DC voltages. The contacts 38b of the first relay are connected in series with the coil 40a of the second relays, this series circuit in turn being connected across the resistor 33b. Under normal conditions, there is current through the coil 38a and the contacts 38b are open. When a repetitive short circuit occurs, the coil 38a is no longer energized and the contacts 38b now close, thereby initiating current flow through the coil 40a of the second relay to close its contacts 40b and appropriately disable the phase control circuit 11. After a period of time sufficient to discharge capacitors 16 and 34, the current decays to less than the holding current and the thyristors in the inverter circuit 17 turn off. As will be demonstrated in FIG. 4, the recovery system can be arranged so that the phase control circuit 11 automatically restarts, in which case the two relays return to their original operating condition. If the closed contacts 40b shunt the soft start capacitor of the phase control circuit 11 as shown in FIG. 4, then the time constant of the relays and capacitors must be matched so that the decay below holding current will take place before the phase control soft start capacitor is released. It will be noted that during a normal start when there is no voltage across the inverter, the phase control circuit 11 is not retarded or disabled because the level of current through the resistor 33b is insufficient to close the contacts 40b.

The automatic short circuit recovery system shown in FIG. 3 is operative with inverter circuits constructed in the half-bridge circuit configuration, or indeed any configuration including at least two thyristors connected in series circuit relationship with inductive elements, whether for commutating purposes or some other purpose, between the power supply terminals. By designing the inverter to have commutating circuits which are independent of the short circuit recovery capacitor 34, the commutating circuits can be designed to do their ordinary job independent of any shoot-through recovery considerations. A short circuit on the load transformer is minor as compared to the current levels that occur during a shoot-through, and can be controlled by conventional current limit provisions in the control circuits, so the commutating circuit can be designed accordingly. Further, as has been pointed out, the load currents that are ordinarily commutated are considerably smaller than the shoot-through currents, and the duration of current reversal can be within the published turnoff times rather than considerably exceed these times as is necessary for a shoot-through recovery current. From a power equipment standpoint, there is considerably more freedom of design allowed then the commutating circuit for the thyristors is independent of the shoot-through recovery system. While the use of the series resistors 33a and 33b is advantageous in the illustrated circuit to reduce voltage overshoots in a high-voltage power supply, in the general case the resistor 33a is not essential and the resistor 33b would be replaced by an inductive element. For this modification, some other way of sensing the current through the impedance element, such as a current transformer, would be required. In any event the outstanding advantage of this shoot-through recovery system is that it operates automatically, without the need of being triggered into operation, and provides a second line of defense in case there are repetitive shoot-through before the capacitor 34 has recovered.

FIG. 4 shows an all solid-state version of the short circuit recovery system combined with the use of the series resistors 33a and 33b, as in FIGS. 1 and 3, to dampen voltage overshoots in a high-voltage power supply. In this embodiment, the first recovery system comprising the capacitor 34 which resonates with either the commutating inductor 19 or the commutating inductor 22 (or possibly both), depending on which pair of thyristor devices are short circuited, is identical to that previously described. The second short circuit recovery system, however, is different in that it employs another way of sensing the reduction of the inverter voltage to zero and a different way of sensing the voltage across the series resistor 33b. The inverter voltage is sensed by means of a Zener diode 43 connected in series with a resistor 44 between the terminals 14' and 15, and the normally constant voltage at their junction point as determined by the breakdown voltage of the Zener diode 43 is supplied as one input to a differential amplifier 45. The differential amplifier 45 is energized from two power supply terminals 46 and 47 that derive their power from the voltage across the series resistor 33b. The negative DC power supply terminal 47 is connected to terminal 14', while the positive DC supply terminal 46 is connected through a resistor 48 to supply terminal 14, and the voltage difference between the two power supply terminals 46 and 47 is clipped to a desired level by a Zener diode 49. The other input to the differential amplifier 45 is connected to the junction point between a resistive voltage divider comprising two resistors 50 and 51 connected between power supply terminals 46 and 47. The values of the components are selected such that the two inputs to the differential amplifier 45 are normally about the same, and there is no output. When, however, the inverter voltage falls to zero and the short circuit current creates a drop across the resistor 33b, there is a difference between the two inputs of the differential amplifier 45 and an output is produced. A circuit for indicating this output in usable form comprises a unijunction transistor 52 having its base electrodes respectively connected in series with a base resistor 53 and the primary winding 54p of a pulse transformer between the supply terminals 46 and 47. The emitter of the unijunction transistor 52 is connected to the junction of a series connected resistor 56 and capacitor 57 that in turn are connected to the output of the amplifier 45. When there is an output from differential amplifier 45, capacitor 57 charges through charging resistor 56 toward the emitter peak point voltage of unijunction transistor 52 with a time constant that allows the circuit to stay inactive while the first recovery system attempts to clear the shoot-through. The unijunction transistor 52 is then rendered conductive to discharge the capacitor 57 and produce a pulse in the pulse transformer winding 54p.

The production of an output signal by the pulse transformer, indicating that the short circuit condition has not been corrected by the oscillatory discharge of the capacitor 34 and still exists, is used to temporarily disable the phase control circuit 11 of the DC power supply for the inverter circuit 17. The phase control circuit 11 can be of any suitable design, and a conventional type including two silicon-controlled rectifiers 58 and 59 and two diodes 60 and 61 is shown. In addition to the filter capacitor 16, the filter circuit includes a series connected filter inductor 62. A known soft start phase control gating circuit supplies gating signals to the coupled gate electrodes of the silicon-controlled rectifiers 58 and 59 at an adjustable phase angle of the AC voltage impressed across the supply terminals 12 and 13, however, in each half cycle only one of the devices 58 and 59 is forward biased and is rendered conductive. One DC supply terminal 63 for the phase control gating circuit is connected directly to the coupled cathode electrodes of the devices 58 and 59, while the other DC supply terminal 64 derives its power through a voltage dropping resistor 65 connected to the coupled cathodes of a pair of similarly poled diodes 66 and 67 respectively connected to the two AC supply terminals 12 and 13 and comprising a full-wave rectifier. Zener diode 77 is preferably connected between terminals 63 and 64. The phase control gating circuit further includes a unijunction transistor 68 connected in series circuit relationship with a base resistor 69 between the supply terminals 63 and 64. The emitter electrode of the unijunction transistor 68 is connected to the junction of a first series RC circuit comprising resistor 70 and capacitor 71, and the junction of these elements is in turn connected through a diode 72 to the junction of a second series RC soft start circuit comprising an adjustable resistor 73 and capacitor 74. In this type of known circuit, the soft start resistor 73 begins to recharge the capacitors 71 and 74 before the end of the half cycle, increasing the DC output of the rectifier. The circuit will not generate an early gating pulse until the soft start capacitor is charged through the adjustable resistor 73, and can be temporarily phased back to late firing by discharging the soft start capacitor. Diode 72' prevents capacitor 74 from discharging during normal firing of UJT 68. For this purpose, a normally nonconducting transistor 76 is connected across the capacitor 74, and has its collector electrode coupled to terminal 64 through resistor 75. The secondary winding 54s of the pulse transformer is connected across the base-emitter junction of the transistor 76. The generation of a pulse in the primary winding 54p of the pulse transformer indicating that the inverter voltage has fallen to zero, develops a current pulse of the correct polarity to turn on the transistor 76, thereby discharging the soft start capacitor 74 and inhibiting the phase control circuit 11 until the soft start capacitor 74 is again recharged. The process of inhibiting the phase control circuit 11, and temporarily shutting down the DC power supply for the inverter circuit 17, is temporary and automatically restarts itself. However, when the circuit is initially started, there is little current in the resistor 33b so that the phase-controlled rectifier is not inhibited and the system starts. The time constant of the various capacitor circuits should be chosen such that the capacitors in the power circuit discharge fully whereby during the temporary shutdown the current through the short-circuited thyristors, whether the thyristors 18 and 20, and/or the thyristors 21 and 23, is reduced below the holding value or to zero thereby allowing them to turn off. When the soft start capacitor 74 is again recharged and the circuit restarts automatically, the shoot-through has been extinguished before the current through the thyristors exists for an injurious length of time. The FIG. 4 circuit, although fully solid-state, operates essentially in the same manner as FIG. 3 and has essentially the same advantages.

In summary, an automatically operating recovery system for shoot-throughs or short circuits through series connected thyristors in a power circuit is provided in an arrangement that is basically independent of the regular commutating circuits, thus offering more freedom of design from a control standpoint particularly in view of the fact that the turnoff time for the thyristors following a shoot-through is considerably longer than published turnoff times. The first-operating recovery system requires only the addition of a shunt capacitor and isolating impedance, since it resonates with the inductive elements in series with the thyristors commonly provided as all or a portion the commutating inductance for the regular commutating circuits, or for current limiting purposes. The more radical second or backup recovery system which temporarily retards or disenables the power supply in the case of a repeated short circuit is especially needed in a high-voltage power supply, such as the high-voltage inverter described here wherein the recovery systems are also conveniently combined with a mechanism to dampen voltage overshoots.

While the invention has been particularly shown and described with reference to several preferred embodiments thereof, it will be understood by those skilled in the art that various changes in form and details may be made therein without departing from the spirit and scope of the invention.

We claim:

1. In a power circuit comprising at least one series circuit including at least two solid-state thyristor devices connected in series circuit relationship with inductor means between a pair of power supply terminals that in turn are connected across an electric potential power supply, a load circuit coupled to a point on said series circuit between said thyristor devices, means for gating said thyristor devices alternately into conduction, and commutating means including said inductor means for turning off said thyristor devices after desired periods of conduction, the improvement that comprises the addition of:

first automatic short circuit recovery means operative when both of said thyristor devices erroneously turn on simultaneously comprising impedance means coupled in series between said power supply and series between said impedance means and series circuit, said capacitor and the inductor means of said series circuit being tuned to series resonance at a frequency selected to supply reverse current for a period of time sufficient to render said short-circuited thyristor devices nonconductive; and second automatic short circuit recovery means for turning off said series connected thyristor devices following a repeated short circuit that occurs after the first recovery means has operated and before the capacitor comprising a portion of said first recovery means has recharged, said second automatic short circuit recovery means comprising means for sensing zero voltage between the supply terminals, means for sensing the voltage across said impedance means, and means responsive to the reduction to zero of the voltage between the supply terminals and to the impedance voltage for at least temporarily disabling said power supply to reduce the power circuit current below the holding value of said thyristor devices.

2. A power circuit as defined in claim 1 wherein the frequency of said first short circuit recovery means is substantially lower than the frequency of the commutating means for said thyristor devices.

3. A power circuit as defined in claim 1 wherein said second automatic short circuit recovery means includes means responsive to the repeated short circuit for temporarily disabling the power supply to reduce the current in the power circuit below the holding value of said thyristor devices.

4. A power circuit as defined in claim 1 wherein said power supply is a phase control rectifier circuit having a gating circuit, and said second automatic short circuit recovery means includes means responsive to the repeated short circuit for temporarily disabling the gating circuit for the phase-control circuit to reduce the current in the power circuit below the holding value of said thyristor devices.

5. A high-voltage inverter circuit comprising:

at least two solid-state thyristor devices connected in series circuit relationship with inductor means between a pair of power supply terminals that in turn are connected across an electric potential power supply, a load circuit including a stepup transformer coupled to a point on said series circuit between said thyristor devices, means for gating said thyristor devices into conduction, and commutating means including said inductor means for turning off said thyristor devices after desired periods of conduction;

first automatic short circuit recovery means operative when both of said thyristor devices erroneously turn on simultaneously including a resistor functioning also to dampen voltage overshoots connected in series between said power supply and series circuit, and a capacitor connected across said supply terminals between said resistor and series circuit, said capacitor and the inductor means of said series circuit being tuned to series resonance at a frequency selected to supply reverse current for a period of time sufficient to render said short-circuited thyristor devices nonconductive; and second automatic short circuit recovery means operative to turn off said thyristor devices following a repeated short circuit that occurs before the first recovery means has recovered comprising means for sensing zero voltage between the supply terminals, means for sensing the voltage across said resistor, and means responsive to the reduction to zero of the voltage between the supply terminals and to the resistor voltage for temporarily disabling said power supply to reduce the inverter circuit current below the holding value of the thyristor devices.

6. An inverter circuit as defined in claim 5 wherein said load circuit further includes a load connected across the secondary winding of said stepup transformer, and a resistor for reducing voltage overshoots connected in series with the primary winding of said stepup transformer.

7. An inverter circuit as defined in claim 5 wherein, in said second automatic short circuit recovery means:
   said means for sensing zero voltage between the supply terminals comprises a resistor connected in series with a Zener diode and with the coil of a first electromechanical relay;
   said means for sensing the voltage across said resistor comprises the contacts of said first relay connected in series with the coil of a second electromechanical relay;
   said power supply is a solid-state phase control rectifier circuit; and
   said means responsive to the reduction to zero of the voltage between the supply terminals and to the resistor voltage comprises the contacts of the second relay which are coupled with said phase control circuit.

8. An inverter circuit as defined in claim 5 wherein, in said second automatic short circuit recovery means:
   said means for sensing zero voltage between the supply terminals comprises a resistor connected in series with a Zener diode;
   said means for sensing the voltage across said resistor comprises a resistor-Zener diode network;
   said power supply is a solid state phase control rectifier circuit; and
   said means responsive to the reduction to zero of the voltage between the supply terminals and to the resistor voltage comprises differential amplifier means that produces an output which is coupled with said phase control circuit.

PO-1050
(5/69)

United States Patent Office
CERTIFICATE OF CORRECTION

Patent No. 3,569,819      Dated Mar. 9, 1971

Inventor(s) F.D. MARTZLOFF, W. MCMURRAY, J.P. WALDEN

It is certified that error appears in the above-identified patent and that said Letters Patent are corrected as shown below:

Column 8, line 6, -- circuit, and a capacitor connected across said power supply terminals -- should be inserted between "series" and "between" so that this line reads as follows:

> "between said power supply and series circuit,
> and a capacitor connected across said power
> supply terminals between said im-"

Signed and sealed this 22nd day of June 1971.

(SEAL)
Attest:

EDWARD M. FLETCHER, JR.
Attesting Officer

WILLIAM E. SCHUYLER, JR.
Commissioner of Patents